July 24, 1934. J. M. VAN SPLUNTER 1,967,340
EXPANSION JOINT FOR BUS BARS
Filed Nov. 21, 1930
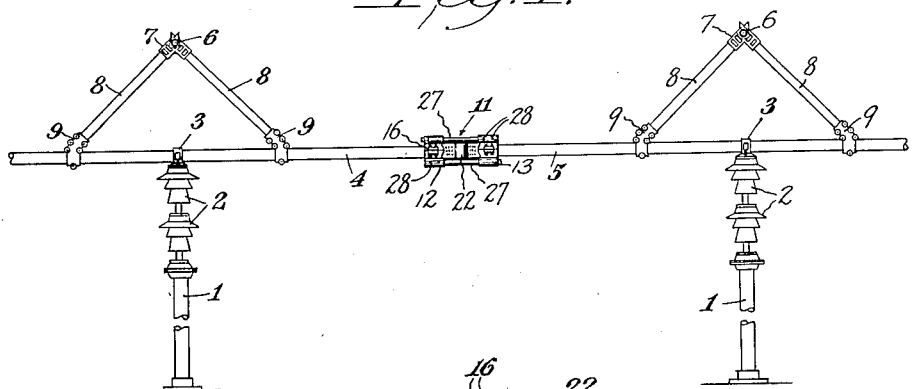
INVENTOR
John M. Van Splunter
BY his ATTORNEYS
Cromwell, Greist and Warden Patented July 24, 1934

1,967,340

UNITED STATES PATENT OFFICE 1,967,340

EXPANSION JOINT FOR BUS BARS

John M. Van Splunter, Grand Rapids, Mich.

Application November 21, 1930, Serial No. 497,124

2 Claims. (Cl. 173—324)

This invention relates to expansion joints for electric bus bars and it has among its objects the provision of an improved self-supporting expansion joint enabling the use of bus bars of long spans, by providing for their free longitudinal expansion and contraction incident to temperature changes while holding the bus bar sections in rigid alignment.

The objects of the invention will be best understood from the following description of an exemplification thereof, reference being had to the accompanying drawing wherein Fig. 1 is a view of a portion of a bus bar system of an electric power station;

Fig. 2 is an elevation of the expansion joint used in the bus bar structure of Fig. 1;

Fig. 3 is a plan view of the expansion joint of Fig. 2; and

Fig. 4 is an end view of the expansion joint of Fig. 2.

In the construction of modern high voltage power stations it is of extreme importance to have the bus bar network by means of which the various apparatus of the station are interconnected with as large clearances as possible and with a minimum of supports and similar interfering elements that do not take part in the conduction of current between the elements. By reducing the number of supports, there is not only cut down the relatively high cost of the insulating structures associated with each support, but in addition, the bus bar structure gains in simplicity and accessibility, which is very important for supervision and maintenance. Furthermore, it facilitates the convenient allocation of the cross-sections, bus taps and associated equipment, and secures maximum safety with a minimum of cost.

Heretofore, the spacing of the supports for the bus bar structures was greatly dependent on the maximum length of the bus bar that could be used without introducing excessive strains into the structure and on the supports, due to the expansion and contraction of the long bus bars incident to the variations of the temperature of the bus bars under the varying conditions of use.

According to my invention, the limitations heretofore encountered in the construction of bus bar arrangements are overcome by the use of bus bars with improved expansible joints so arranged as to permit free longitudinal expansion and contraction of the bus bars, but prevent lateral movement of the bus bar parts out of the direction of alignment, thereby eliminating stresses on the supports and on the structure due to expansion and contraction, while retaining rigidity against lateral bending like continuous, rigid bus bars.

To illustrate the invention there is shown in the drawing a portion of a main bus bar phase of an extended bus bar arrangement of a power station. At spaced intervals there are mounted in the ground, vertical supporting posts 1, usually of iron tubing, carrying at their tops high voltage insulators 2. On the tops of the insulators 2 are mounted clamps 3 within which are firmly clamped sections 4, 5 of the main bus bar of one phase of the system. The bus bars are made of suitable high current carrying capacity conductors, and in the exemplification shown in the drawing, they are made of copper tubing.

To provide connections to individual banks of transformers or the like extending alongside the bus bars, transverse bus taps 6, which may likewise be of copper tubing, are connected at spaced intervals to the main bus bar. The tap buses 6 are held clamped in clamp connectors 7 held in place by a V-shaped brace formed of two tubular conducting brace arms 8 having their ends secured to the main bus bar by means of end clamps 9 on both sides of the supporting clamp 3.

In order to eliminate introduction of stresses into the supports 2 of the main bus bar and avoid the limitations in choice of the free bus span, the bus sections 4 and 5 are not made in the form of one, continuous, rigid member, but are split, and the two split ends are joined to each other by means of a self-supporting expansion joint 11 shown in detail in Figs. 2 to 4.

The expansion joint comprises two junction members 12, 13. The junction members in the form shown are made of a copper casting and have a central portion constituting a cylindrical clamp 14 adapted to fit over the end of the bus bar section and be clamped thereto by means of bolts 15 extending between upstanding flanges 16 on both sides of a longitudinal slit 17 in the cylindrical clamp. The shape and the construction of the clamping member 14 will of course depend on the shape of the bus bar, and if flat bus bars are used, the clamping member may be provided with a suitable slot fitting over the bus bar.

Each junction member is further provided on the side extending toward the opposite junction member with a terminal block 20 having two flat slots 21 into which are inserted the ends of two flexible loop connectors 22. The flexible loop connectors are preferably made of a plurality of flat copper strips, and the ends of the connectors are firmly secured within the slots 21 and clamped to the adjacent portions of the terminal block 20, as by means of rivets 23 or solder, so as to constitute a perfect electrical connection between the two opposite junction members 12 and 13. As seen in Fig. 3, the connector strips are bent outwardly to form two outward loops and providing spaces between the strips for the circulation of air, and securing proper ventilation and cooling during operation. In the arrangement shown, the strips constituting the connectors 22 stand edgewise in vertical direction so that the air readily circulates through the adjacent free spaces and secures effective cooling action.

On the top and the bottom of the central clamping member 14 of each junction member there are formed extensions 25 provided with longitudinal perforations 26. The perforations 26 on the opposite junction members are aligned with each other, and heavy guide rods 27 of brass or the like extend through the opposite perforations. One of the guide rods 27 has one of its ends secured, as by means of rivets or pins 28, in the perforation lying on one side of the junction member 12, and the other guide rod 27 has one of its ends similarly secured in the perforation lying on the opposite side of the junction member 13, the other ends of each of the guide rods being free to slide in its associated perforation 26. In this way, the two junction members 12 and 13 may move towards and away from each other in the direction along the guide rod, but lateral movement or bending of the junction members 12 and 13 relative to each other is prevented by the engagement of the guide rods with the associated perforations 26, which thus form guiding channels for the guide rods.

The copper strips forming the connectors 22 are made so as to readily yield and flex in accordance with the movement of the junction members towards and away from each other. Half-hard copper may be used for such connectors, as they normally retain their shape while at the same time readily yielding to the to-and-fro movement of the junction members. The expansion loops extend into the space between the two guide rods 27 and are protected by the rods to secure free expansion and contraction, depending on the position of the junction members.

With the foregoing arrangement, the expansion joint holds the two bus sections 4 and 5 extending from the opposite supports in rigid alignment with each other, preventing the ends of the two bus sections from moving away from each other, and holding the sections together so that for all lateral forces the two sections act as if they constituted parts of a single, rigid bar. At the same time, the relative freedom of longitudinal movement of the junction sections permits free longitudinal expansion and contraction of the aligned bus sections, depending on the varying temperature conditions, thereby eliminating introduction of stresses into the bus supports and the associated structures.

The invention is adaptable for embodiment in many other forms that will suggest themselves to those skilled in the art, and it is not limited to any specific features of construction or materials referred to in the foregoing description of the exemplification. The expansible joint is not limited in its usefulness to the specific bus bar arrangement described, but will be found useful by those skilled in the art in a great many other bus bar arrangements where rigid support of the bus bar members against lateral bending stresses is important, and at the same time, stresses due to longitudinal expansion or contraction of the bus bars must be eliminated. It is accordingly desired that the appended claims be given a broad construction commensurate with the scope of the invention within the art.

I claim:

1. An expansion joint for holding in alignment the sections of a horizontal split bus bar to permit longitudinal expansion and contraction of the bus bar and prevent movement of the bus bar sections out of alignment comprising a pair of rigid metallic clamping members adapted to be rigidly clamped in alignment on the opposite ends of two bus bar sections, a pair of flexible connectors, each comprising flat transversely flexible metal strips assembled with vertically upstanding surfaces side by side and having the opposite ends rigidly joined to the two aligned clamping members, the strips of each connector being of greater length than the distance between their junction points to said clamping members and being arranged to expand or contract in opposite horizontal directions relatively to the line of alignment of said clamping members as the distance between said clamping members is varied, and a pair of rigid guide rods extending between said clamping members on the opposite sides of said strips in a vertical plane aligned with the bus bar, each clamping member having a pair of longitudinal channels engaging the opposite ends of said guide rods to permit slidable movement of one clamping member toward and away from the other along said rods but prevent movement of said junction members out of the direction of alignment.

2. An expansion joint for holding in alignment the sections of a horizontal split, rigid bus bar to permit longitudinal expansion and contraction of the bus bar and prevent movement of the bus bar sections out of alignment comprising a pair of rigid metallic clamping members adapted to be rigidly clamped in alignment on the opposite ends of two bus bar sections, a pair of flexible connectors, each comprising flat transversely flexible metal strips assembled with vertically upstanding surfaces side by side and having the opposite ends rigidly joined to the two aligned clamping members with intervening free air spaces between adjacent strips, the strips of each connector being of greater length than the distance between their junction points to said clamping members and being arranged to expand and contract in horizontal direction in opposite directions relatively to the line of alignment of said clamping members as the distance between said clamping members is varied with intervening free spaces between adjacent strips, and a pair of rigid guide rods extending between said clamping members on the top and the bottom sides, respectively of said strips, each clamping member having a pair of longitudinal channels engaging the opposite ends of said guide rods to permit slidable movement of one clamping member toward and away from the other along said rods but prevent movement of said junction members out of the direction of alignment.

JOHN M. VAN SPLUNTER.